Patented Nov. 10, 1936

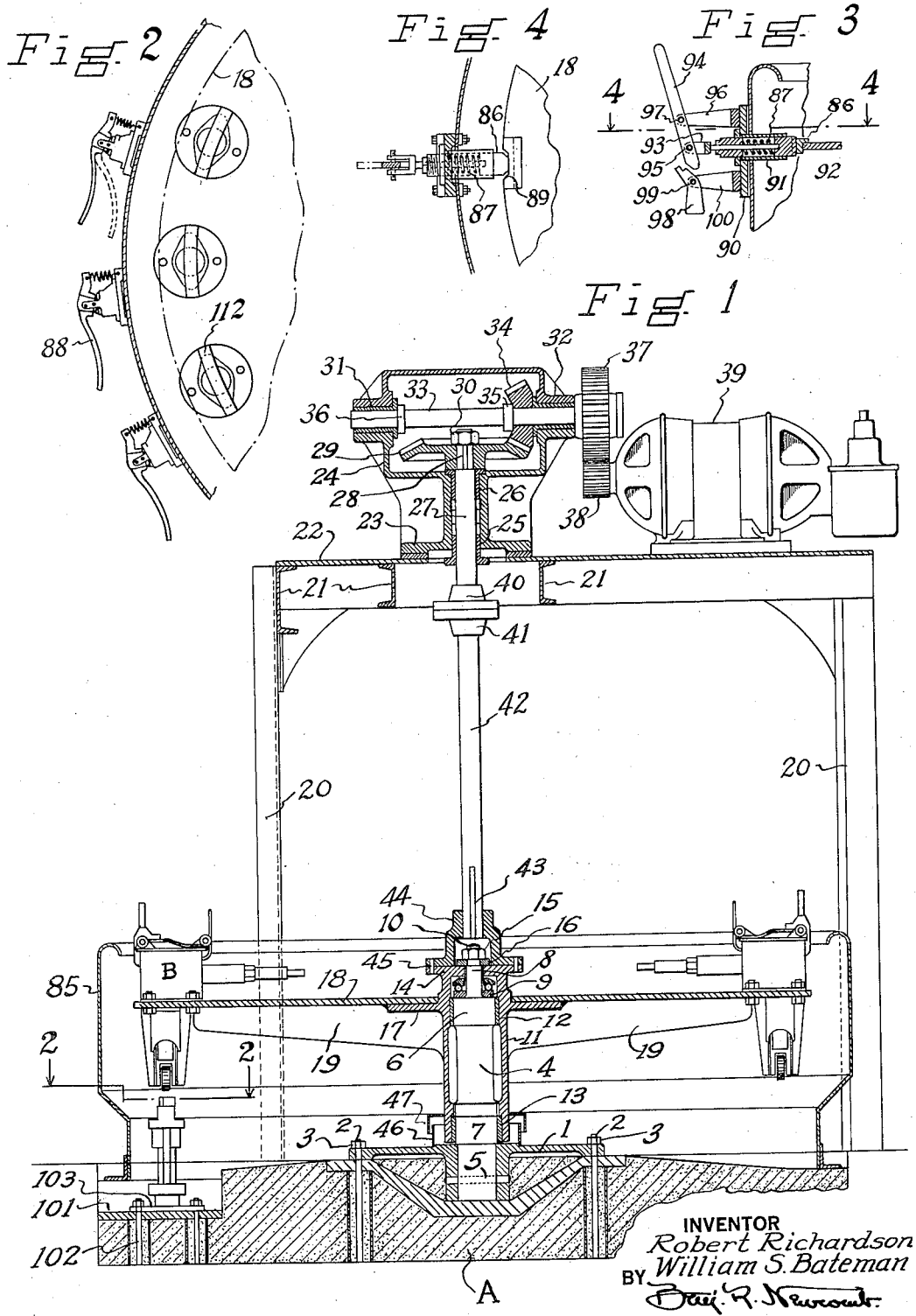

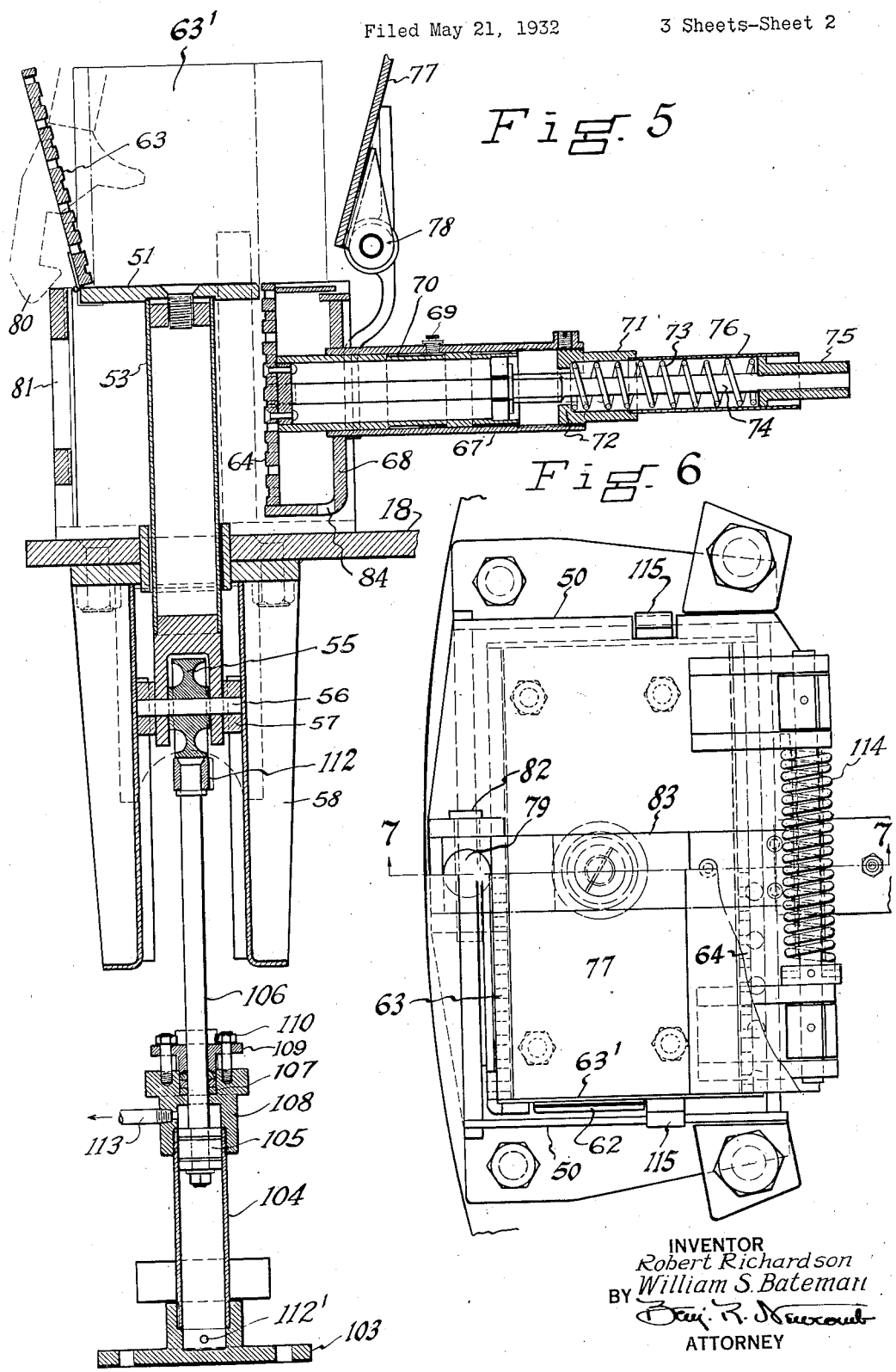

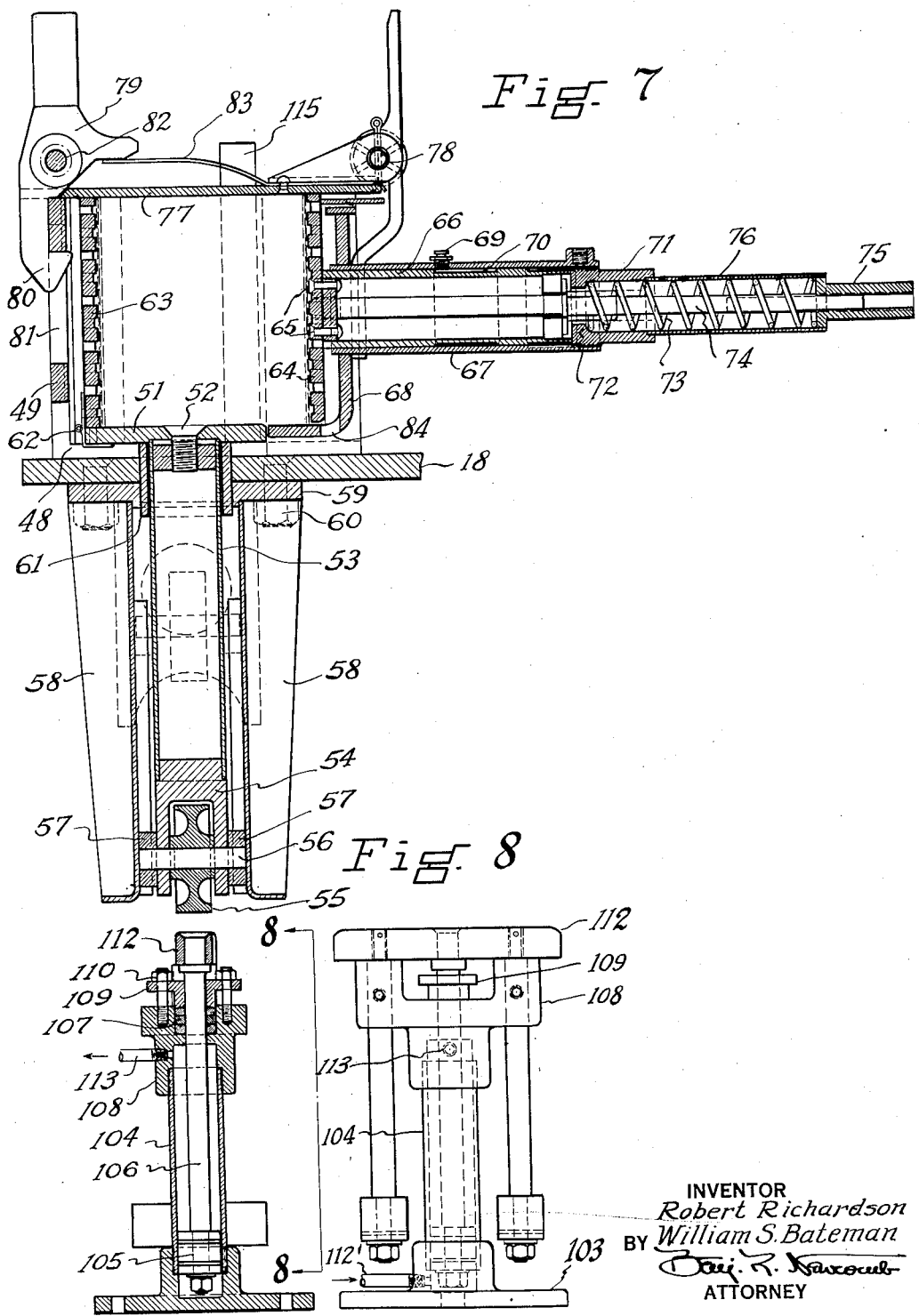

2,060,121

UNITED STATES PATENT OFFICE 2,060,121

CENTRIFUGAL MOLDING MACHINE

Robert Richardson and William S. Bateman, Jr., East Liverpool, Ohio, assignors to The Babcock & Wilcox Company, Bayonne, N. J., a corporation of New Jersey Application May 21, 1932, Serial No. 612,708

6 Claims. (Cl. 25—41)

This invention relates to a machine for treating a wet moldable mixture.

One of the objects of the present invention is to provide a machine which coincidentally extracts liquid from a wet mix and molds the mix into raw structural form, it being a function of the operation of the machine that the water is so extracted that every cross section of the resulting raw form is equally deliquidized, and for this reason it is especially adapted for use in the manufacture of porous brick wherein an aerated mixture is treated.

A further feature of the invention resides in the provision of a machine which functions centrifugally to deliquidize the wet mix and coincidentally mold the same, no appreciable pressure other than centrifugal force being applied to the mix during the molding operation and by reason of which it is again, as above stated, especially applicable to the molding of aerated mixes in the formation of highly porous brick of low thermal conductivity.

Another feature of the invention is the provision of means which eliminates the curve which would otherwise be the natural shape of a brick shaped on the free side when molded in the centrifugal machine.

A still further feature resides in the particular manner in which the molds are drained of the liquid separated out during the molding operation.

With the above and other objects in view we will now described one form of the invention by way of illustration of the manner of carrying the invention into practice.

In the drawings—

Fig. 1 is a vertical central sectional view, in side elevation, of a machine constructed in accordance with the present invention;

Fig. 2 is a sectional view on the line 2—2 of Fig. 1;

Fig. 3 is a fragmentary vertical sectional view showing the table locking device;

Fig. 4 is a view on the line 4—4 of Fig. 3;

Fig. 5 is a vertical sectional side elevation of the draining mold and its operating mechanism;

Fig. 6 is a top plan view of the same;

Fig. 7 is a side elevation similar to Fig. 5 but with the mold in the retracted position; and Fig. 8 is a side elevation of the mold projecting mechanism in the direction of the line 8—8 of Fig. 7.

The machine, as shown, comprises the foundation A, of concrete or the like, upon which is mounted the base plate 1 drilled to be received upon the grouted bolts 2 and retained by nuts 3.

The base plate 1 is centrally apertured to receive the vertical spindle 4 fixed with respect to the base plate 1 by a pin 5. The vertical spindle 4 is provided with upper and lower bearing surfaces 6 and 7, and a reduced upper end portion 8 forming, with the main portion of the vertical spindle, a shoulder which receives a ball or other thrust bearing 9, the end of said reduced portion 8 being threaded as at 10 for a purpose to be hereinafter set forth.

Mounted upon the vertical spindle 4 is a driven member generally designated as 11 and bored out to receive bushings 12 and 13 running on bearing surfaces 6 and 7, respectively, of the center spindle 4 and having its upper driving flange 14 resting upon the thrust bearing 9, the said driven member 11 being maintained on the vertical spindle 4 by the nut 15 and washer 16 on the reduced threaded end 8 of said spindle 4 as shown.

The driven member 11 is provided with a flange 17 which receives and supports a table 18 of circular form, and which is additionally supported by radial arms 19 carried by the driven member 11. The flange 17, table 18 and arms 19 may be maintained in assembled relation by welding or any other suitable means.

Above the table 18 and carried upon uprights 20 are cross members 21 which support a platform 22 upon which is mounted the base 23 of a driving gear box 24 which has vertical bearings 25 and 26 receiving the stub shaft 27, the upper end of which is keyed as at 28 to a bevel gear 29 within the gear box 24 and held on said shaft by the jam nut 30; in this same gear box 24 are horizontal bearings 31 and 32 journaling a horizontal shaft 33 having a bevel gear 34 fixed thereto and restrained against displacement by a collar 35, a collar 36 also acting to prevent displacement of the shaft 33. Outside of the gear box 24 and fixed to the shaft 33 is a gear 37 meshing with a gear 38 on the shaft of the driving motor 39 also mounted upon the platform 22.

On the lever end of the stub shaft 27 is a coupling member 40 which is in driving engagement with a companion member 41 on vertical shaft 42, the lower end of which is, at 43, in keyed relation to a coupling member 44 which is in driving relation, as by pins 45 with its companion member 14 on the driven member 11 and thus the motor 39 rotates the table 18.

In order to protect the bearing surface 7 the foundation plate 1 is provided with an annulus 46 and the driven member 11 carries a flange 47 which overlaps the same and provides a labyrinth excluding dust.

The table 18, at uniformly spaced intervals around its periphery, has mounted thereon draining molds B, each of which comprises a box-like form having a bottom 48, front 49 and ends 50 within which is a false bottom 51 secured as at 52 to one end of a tubular support 53. The tubular support 53, at its bottom, receives the bifurcated member 54 having journaled therein the roller 55 on the pin 56 which carries guide pieces 57 sliding in guide members 58 on opposite sides, and which are secured to the table 18 by means of a base 59 and bolts 60. A bushing 61 supports the upper end of the tubular member 53 in its reciprocating movement. The false bottom 52 has hinged thereto, as at 62 the foraminous front 63 and sides 63'. Opposite this foraminous side 62 and parallel thereto is the foraminous member 64 which is secured as at 65 to reciprocating member 66 within the casing 67 mounted in the support 68, and which has a limit stop screw 69 traveling in the passage 70 of the reciprocable member 66. The end of the casing 67 is provided with a threaded guide 71 having a shoulder 72 against which a spring 73 bears, this spring 73 surrounds a spindle 74, which is guided in a tail guide 75 which is supported in the tubular member 76 surrounding the spring and which thus confines the spring between the shoulder 72 and the inner end of the tail guide 75. The tail guide 75 is secured to the rod 74 so that as the foraminous side 64 is moved toward the foraminous side 63 the spring 73 is compressed. A cover plate 77 is hinged as at 78 and carries at its forward side a locking lever 79 with a latch 80 engaging an opening 81 in the side 49, said locking lever being hinged to the cover as at 82 and provided with a spring 83 which maintains the latch 80 in position until manually unlatched. When the latch 80 is disengaged from the recess or opening 81 the cover plate 77 may be raised to the elevated position shown in Fig. 5. A liquid vent 84 is provided in the bottom of the supporting member 68 to drain away liquid.

It will be seen from the foregoing that if the support 53 is projected upwardly the parts 63 and 63' will fall away by reason of its hinged joints 62.

In order to project the interior of the mold upward the table 18 must be locked in position. A spray gathering annulus 85 encloses the upper edge of the table and rises to approximately the elevation of the molds B and carries detents 86 spring pressed as shown at 87 and lever actuated as shown at 88, which engages a notch 89 in the edge of the table 18 for the purpose of registering the molds with operating mechanism to be hereinafter described. The detent mechanism is more clearly shown in Figs. 3 and 4 and consists of a bracket 90 which has a plunger 91 pressed into operative position by the spring 87 housed within a casing 92, and the end of said plunger or detent is provided with a bifurcated rod 93 pivoted to the lever 94 as at 95, and to a support 96 as at 97 so that a lever may be operated to retract the detent 86, a locking piece 98 being pivoted as at 99 to the support 100 for the purpose of locking the detent in the nonengaging position.

The operating mechanism for the molds comprises a base plate 101 secured by bolts 102 to the foundation A and which, in turn, secures in position bases 103 carrying air cylinders 104 in each of which there is located a piston 105 connected with a piston rod 106 passing through the packing 107 in the upper end 108 of the air cylinder, and said packing being compressed by gland 109 secured by gland bolts 110. The upper end of the piston is provided with an engaging member 111 which has the arcuate shaped piece 112 thereon which is adapted to engage the rollers 55 when the molds are in the position registered for detent engagement of the detents 86 with the notches 89 in the table 18. In this position air is admitted beneath the piston 105 through the port 112 to drive the piston 105 upwardly and upon the molds, as shown in Fig. 5, the latch 80 being first disengaged. The molds may be retracted by relieving the air from beneath the piston and admitting air to reverse the motion of the piston through the pipe 113, a suitable valve (not shown) being provided for this purpose.

The mold cover 77 is hinged as shown clearly in Fig. 6 and is thrown to open position by the spring 114. Guides 115 are provided to engage the end pieces 63' of the mold to return them to their normal position when the mold parts are retracted.

In the operation of the machine heretofore described, a wet mix such for instance as an aerated mixture for forming insulating bricks, is filled into the molds when such molds are in the retracted position, but with the cover 77 open. The mold covers are latched down after the molds are filled. When all the molds have been filled and the covers latched the motor 39 is started and revolves the table 18 with the result that centrifugal force deliquidizes the mix in each mold uniformly throughout the area of each brick shape.

The brick shapes are assisted in taking form both by the centrifugal action on the material itself and by the fact that the centrifugal action causes the foraminous follower plates 64 to come against the mix in each mold, such followers moving against the restraint of springs 71, the tension of which may be adjusted to give the followers the proper action.

As soon as the table 18 is stopped the molds B are registered by the detents 86 in the proper position for extraction of the molded brick shapes and the latches 80 disengaged. The air operated plungers 105 then are utilized to project the molds to the open position shown in Fig. 5, whereupon the sides fall away from the brick shape and the shape may be removed.

While, in the foregoing, we have described a specific embodiment of the invention, it is nevertheless to be understood that in practicing the invention we may resort to any modifications defined by the appended claims.

We claim—

1. A molding machine for building units comprising a rotary table having draining molds including movable sides operable to open and closed positions and receiving a batch of liquid carrying material, a retractable follower for each mold, means for rotating the table to deliquidize the material and whereby the follower is moved into contact with the material when the mold is in closed position, means for retracting the follower when the table is stationary, and means for opening the mold only when the table is stationary.

2. A molding machine for building units comprising a rotary table having draining molds including movable sides operable to open and closed positions and receiving a batch of liquid carrying material, a retractable follower for each mold, a tension adjustment for said follower, means for rotating the table to deliquidize the material and whereby the follower is moved into contact with the material when the mold is in the closed position, means for retracting the follower when the table is stationary, and means for opening the mold only when the table is stationary.

3. A molding machine for building units comprising a rotary table having draining molds including movable sides operable to open and closed positions and receiving a batch of liquid carrying material, a centrifugally moved retractable follower for each mold, a tension adjustment for said follower, means for rotating the table to deliquidize the material and whereby the follower is moved into contact with the material when the mold is in the closed position, means for retracting the follower when the table is stationary, means for opening the mold only when the table is stationary, and means for locking the table in a position to register the molds with the mold-opening means.

4. A molding machine for building units comprising a rotary table having draining molds including movable sides operable to open and closed positions and receiving a batch of liquid carrying material, a centrifugally moved retractable follower for each mold, a tension adjustment for said follower, means for rotating the table to deliquidize the material and whereby the follower is moved into contact with the material when the mold is in the closed position, means for retracting the follower when the table is stationary, and fluid operated means for opening the mold only when the table is stationary.

5. A molding machine for building units comprising a rotary table having draining molds including foraminous movable sides operable to open and closed positions and receiving a batch of liquid carrying material, a centrifugally moved retractable follower for each mold, means for rotating the table to deliquidize the material and whereby the follower is moved into contact with the material when the mold is in closed position, means for retracting the follower when the table is stationary, and means for opening the mold only when the table is stationary.

6. A molding machine for building units, comprising reticulated collapsible molds adapted to be filled with a semi-liquid material and arranged for movement in a circular path for centrifugally deliquidizing the material, a perforate follower in each mold centrifugally maintained in contact with the material as the same is drained means for supporting and moving said molds at a deliquidizing speed, means assisting in removing the molded units from the molds, and locking means securing each mold stationary in a predetermined location with respect to said assisting means.

ROBERT RICHARDSON.
WILLIAM S. BATEMAN, Jr.